US012445589B2

United States Patent
Yu et al.

(10) Patent No.: US 12,445,589 B2
(45) Date of Patent: Oct. 14, 2025

(54) CALIBRATION METHOD, APPARATUS, DEVICE AND SYSTEM FOR HEAD-MOUNTED DISPLAY DEVICE, AND STORAGE MEDIUM

(71) Applicant: GOERTEK INC., Weifang (CN)

(72) Inventors: Changhe Yu, Weifang (CN); Zhixing Shen, Weifang (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 18/638,840

(22) Filed: Apr. 18, 2024

(65) Prior Publication Data

US 2024/0267505 A1   Aug. 8, 2024

Related U.S. Application Data

(63) Continuation of application No. PCT/CN2021/135587, filed on Dec. 6, 2021.

(30) Foreign Application Priority Data

Nov. 29, 2021   (CN) .......................... 202111434450.8

(51) Int. Cl.
*H04N 13/327*   (2018.01)
*H04N 13/00*    (2018.01)
*H04N 13/344*   (2018.01)

(52) U.S. Cl.
CPC ......... *H04N 13/327* (2018.05); *H04N 13/344* (2018.05); *H04N 2013/0081* (2013.01)

(58) Field of Classification Search
CPC .... H04N 13/127; H04N 13/344; G06T 17/00; G06T 7/586
(Continued)

(56) References Cited

U.S. PATENT DOCUMENTS 8,422,777 B2 * 4/2013 Aller .................. G06T 7/73
382/165
2016/0012643 A1 * 1/2016 Kezele ................ H04N 13/344
345/633
(Continued)

FOREIGN PATENT DOCUMENTS

CN    105320271 A    2/2016
CN    106791784 A    5/2017
(Continued)

OTHER PUBLICATIONS

First Office Action in Corresponding Chinese Application No. 202111434450.8, dated Oct. 26, 2024; 15 pgs.
(Continued)

*Primary Examiner* — Dave Czekaj
(74) *Attorney, Agent, or Firm* — HAUPTMAN HAM, LLP

(57) ABSTRACT

Disclosed are a calibration method, an apparatus, a device and a system for a head-mounted display device, and a computer-readable storage medium. The calibration method includes: obtaining a three dimensional (3D) point coordinate corresponding to a target calibration graphic card image; the target calibration graphic card image includes an image of a calibration graphic card, and the target calibration graphic card image is an image captured by a positioning assembly in response to that a preset image of the calibration graphic card projected by an optical engine on a see-through display coincides with a real calibration graphic card under a perspective of a wearer of the head-mounted display device; determining a corresponding relationship between a projection coordinate system of the optical engine and a coordinate system of the positioning assembly according to the 3D point coordinate; and calibrating display content of
(Continued)

the head-mounted display device according to the corresponding relationship.

9 Claims, 6 Drawing Sheets

(58) Field of Classification Search
USPC .......................................................... 348/51
See application file for complete search history.

(56) References Cited

U.S. PATENT DOCUMENTS

| | | |
|---|---|---|
| 2018/0075593 A1 | 3/2018 | Wang et al. |
| 2021/0142508 A1 | 5/2021 | Azimi et al. |
| 2021/0158552 A1* | 5/2021 | Berger .................... G06T 17/00 |
| 2022/0027671 A1* | 1/2022 | Mukherjee ............. G06V 20/20 |
| 2023/0324988 A1* | 10/2023 | Eble .......................... G06T 7/70 |
| | | 345/156 |

FOREIGN PATENT DOCUMENTS

| | | |
|---|---|---|
| CN | 109801379 A | 5/2019 |
| CN | 109919933 A | 6/2019 |
| CN | 110503694 A | 11/2019 |
| CN | 110782499 A | 2/2020 |
| CN | 112326206 A | 2/2021 |

OTHER PUBLICATIONS

International Search Report and Written Opinion issued in International Application No. PCT/CN2021/135587; mailed Aug. 25, 2022; 13 pgs.

Grubert, Jens et al: "A Survey of Calibration Methods for Optical See-Through Head-Mounted Displays"; Journal of Latex Class Files; Sep. 2014, vol. 13, No. 9; pp. 1-14.

Li, Hai-Long et al.; "Optical See-Through HMD Calibration"; Computer System Application, vol. 22, No. 7, 2013; pp. 152-155.

* cited by examiner obtaining a three-dimensional (3D) point coordinate corresponding to a target calibration graphic card image; the target calibration graphic card image includes an image of a calibration graphic card, and the target calibration graphic card image is an image captured by a positioning assembly when a preset image of the calibration graphic card projected by an optical engine on a see-through display coincides with a real calibration graphic card from a perspective of the wearer of the head-mounted display device ⸺S101

↓ determining a corresponding relationship between the projection coordinate system of the optical engine and the coordinate system of the positioning assembly according to the 3D point coordinate ⸺S102

↓ calibrating the display content of the head-mounted display device according to the corresponding relationship ⸺S103

FIG. 1

CALIBRATION METHOD, APPARATUS, DEVICE AND SYSTEM FOR HEAD-MOUNTED DISPLAY DEVICE, AND STORAGE MEDIUM

CROSS-REFERENCE TO RELATED APPLICATIONS

The present application is a continuation application of International Application No. PCT/CN2021/135587, filed on Dec. 6, 2021, which claims priority to Chinese Patent Application No. 202111434450.8, filed on Nov. 29, 2021. The disclosures of the above-mentioned applications are incorporated herein by reference in their entireties.

TECHNICAL FIELD

The present application relates to the technical field of head-mounted display devices, and in particular to a calibration method, an apparatus, a device and a system for a head-mounted display device, and a computer-readable storage medium.

BACKGROUND

Currently, transmissive projection head-mounted display devices such as augmented reality (AR) devices and mix reality (MR) devices can generate a virtual and real environment. In this environment, various information generated by the computer is configured to enhance or supplement the real environment in which the user is located, which can be markers and three-dimensional (3D) rendering models, or can be changes to the colors or shading in the real environment. Compared with the virtual reality (VR), transmissive projection head-mounted display devices such as the AR can bring the computer into the user's world instead of immersing the user in the computer world, which allows users to receive various auxiliary information from the computer about real objects during their interaction with these objects.

One of the key technologies of the transmissive projection head-mounted display device is the problem of precise positioning. When the user changes the viewing point, the virtual object must be consistent with the movement direction and position of the real object, so that the user can feel that the virtual object is integrated into the real environment. To accurately display virtual objects overlaid on real objects, the positions and directions of real objects and virtual objects in a certain world coordinate system must be known, real objects and computer-generated objects must be accurately positioned, and the device properties must be precisely specified.

In the related art, the traditional calibration method for transmission projection head-mounted display device requires a cumbersome process of repeatedly moving the head-mounted display device and repeatedly aligning to collect data, which takes a lot of time to calibrate and is not suitable for large-scale mass production. Therefore, how to simplify the calibrate process of the transmission projection head-mounted display device and save the time of calibration is an urgent problem today.

SUMMARY

The main purpose of the present application is to provide a calibration method, an apparatus, a device and a system for a head-mounted display device, and a computer-readable storage medium, aiming to simplify the calibration process for a transmission projection type head-mounted display device and save the time of calibration.

In order to solve the above technical problems, the present application provides a calibration method for a head-mounted display device, including:
  obtaining a three dimensional (3D) point coordinate corresponding to a target calibration graphic card image; the target calibration graphic card image includes an image of a calibration graphic card, and the target calibration graphic card image is an image captured by a positioning assembly in response to that a preset image of the calibration graphic card projected by an optical engine on a see-through display coincides with a real calibration graphic card under a perspective of a wearer of the head-mounted display device;
  determining a corresponding relationship between a projection coordinate system of the optical engine and a coordinate system of the positioning assembly according to the 3D point coordinate; and
  calibrating display content of the head-mounted display device according to the corresponding relationship.

In an embodiment, before obtaining the 3D point coordinate corresponding to the target calibration graphic card image, the method further includes:
  controlling, by a control host, a camera under the perspective of the wearer to capture a projection image of the see-through display;
  determining whether the preset image displayed in the see-through display in the projection image coincides with the real calibration graphic card; and
  in response to that the preset image displayed in the see-through display in the projection image coincides with the real calibration graphic card, obtaining the 3D point coordinate corresponding to the target calibration graphic card image.

In an embodiment, after the controlling, by the control host, the camera under the perspective of the wearer to capture the projection image of the see-through display, the method further includes:
  in response to that the preset image displayed in the see-through display in the projection image does not coincide with the real calibration graphic card, controlling a movable device of the calibration graphic card to move the calibration graphic card according to the projection image.

In an embodiment, the obtaining the 3D point coordinate corresponding to the target calibration graphic card image includes:
  determining, by the head-mounted display device, the 3D point coordinate by using a calibration pattern in the target calibration graphic card image according to an obtained calibration graphic card alignment instruction.

In an embodiment, in response to that the corresponding relationship is a 3*4 projection matrix, the determining the corresponding relationship between the projection coordinate system of the optical engine and the coordinate system of the positioning assembly according to the 3D point coordinate includes:
  calculating the 3*4 projection matrix through singular value decomposition according to the 3D point coordinate.

The present application also provides a calibration apparatus for a head-mounted display device, including:
  an obtaining module configured to obtain a 3D point coordinate corresponding to a target calibration graphic card image; the target calibration graphic card image includes an image of the calibration graphic card, and the target calibration graphic card image is an image captured by the positioning assembly in response to that a preset image of the calibration graphic card projected by an optical engine on a see-through display coincides with a real calibration graphic card from a perspective of the wearer of the head-mounted display device;

a determining module configured to determine a corresponding relationship between a projection coordinate system of the optical engine and a coordinate system of the positioning assembly according to the 3D point coordinate; and a calibration module configured to calibrate a display content of the head-mounted display device according to the corresponding relationship.

The present application also provides a calibration device for a head-mounted display device, including:

a memory configured to store a computer program; and a processor configured to implement the calibration method for the head-mounted display device when the computer program is executed.

The present application also provides a calibration system for a head-mounted display device, including a head-mounted display device and a control host;

and the control host is the calibration device for the head-mounted display device.

In an embodiment, the calibration system for the head-mounted display device further includes:

a camera configured to capture a projection image of a see-through display of the head-mounted display device under a perspective of a wearer of the head-mounted display device; and a movable device configured to move a calibration graphic card according to a control of the control host.

The present application also provides a computer-readable storage medium, a computer program is stored on the computer-readable storage medium, and the calibration method for the head-mounted display device is implemented in response to that the computer program is executed by a processor.

It can be seen that the present application determines the corresponding relationship between the projection coordinate system of the optical engine and the coordinate system of the positioning assembly based on the 3D point coordinate corresponding to the obtained target calibration graphic card image, and simplifies the process of collecting the calibration data, which only requires one alignment to calibrate, saves the time of calibration and is suitable for large-scale mass production. In addition, the present application also provides a calibration apparatus, a device and a system for the head-mounted display device, and a computer-readable storage medium, which also has the above beneficial effects.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those skilled in the art, other drawings can also be obtained according to the structures shown in these drawings without any creative effort.

FIG. 1 is a flowchart of a calibration method for a head-mounted display device according to an embodiment of the present application.

DETAILED DESCRIPTION OF THE EMBODIMENTS

In order to make the purpose, technical solution and advantages of the present application clearer, the technical solutions of the embodiments of the present application will be described in more detail below with reference to the accompanying drawings. It is obvious that the embodiments to be described are only some rather than all of the embodiments of the present application. All other embodiments obtained by those skilled in the art based on the embodiments of the present application without creative efforts shall fall within the scope of the present application.

Please refer to FIG. 1. FIG. 1 is a flowchart of a calibration method for a head-mounted display device according to an embodiment of the present application, including:

step S101, obtaining a three-dimensional (3D) point coordinate corresponding to a target calibration graphic card image.

The target calibration graphic card image includes an image of a calibration graphic card, and the target calibration graphic card image is an image captured by a positioning assembly when a preset image of the calibration graphic card projected by an optical engine on a see-through display coincides with a real calibration graphic card from a perspective of the wearer of the head-mounted display device.

Figure 2:
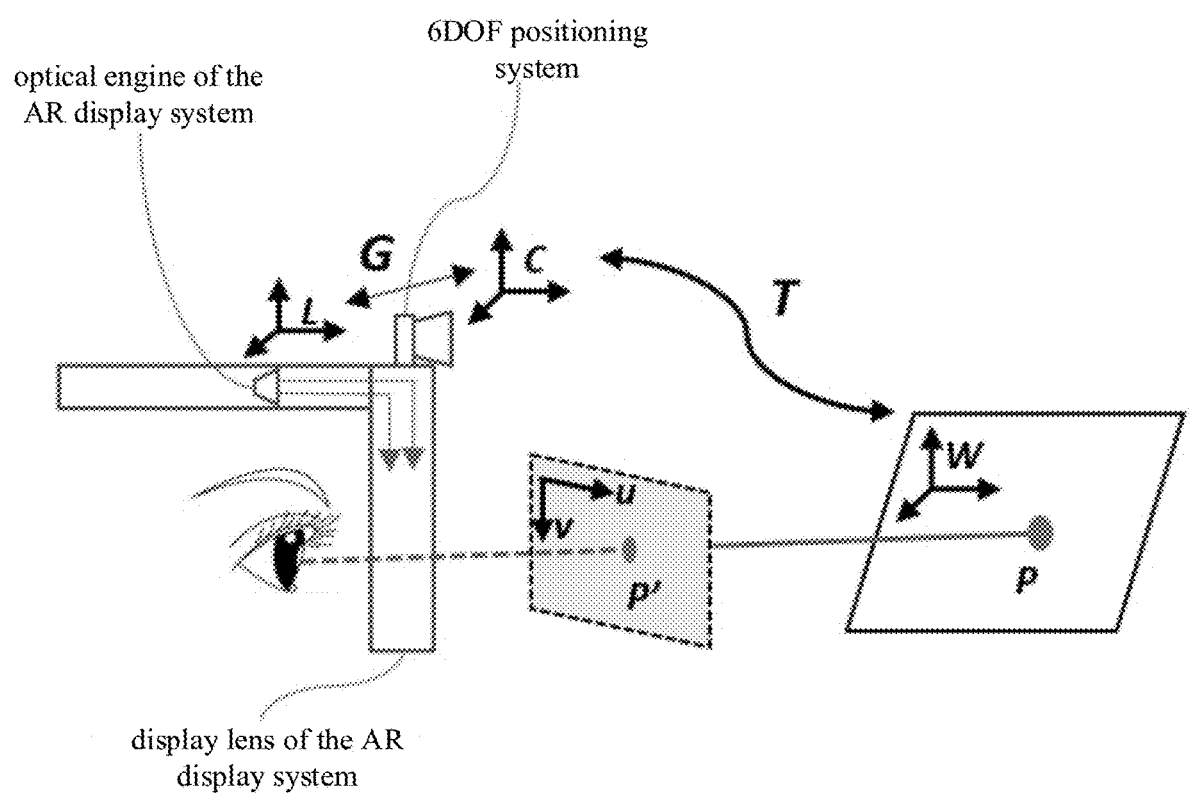
FIG. 2 is a schematic view of a principle of a calibration method for the head-mounted display device according to an embodiment of the present application.

It can be understood that the optical engine, the see-through display and the positioning assembly in this step can all be components of the head-mounted display device. This embodiment does not limit the specific spare parts types of the optical engine, the see-through display and the positioning assembly. As shown in FIG. 2, when the head-mounted display device is an augmented reality (AR) device, the optical engine can be the optical engine of the AR display system, the see-through display can be the display lens of the AR display system, and the positioning assembly can be the 6 degree of freedom (DOF) positioning assembly of the 6DOF positioning system. The preset image of the calibration graphic card in this step can be an image containing the calibration graphic card that is preset to be displayed on the see-through display (such as the display lens in FIG. 2).

In an embodiment, the target calibration graphic card image in this step can be the image captured by a shooting equipment of the positioning assembly when the preset image displayed in the see-through display from the perspective of the wearer of the head-mounted display device coincides with the real calibration graphic card that can be viewed through the see-through display, that is, the calibration graphic card image. For example, the user can calibrate by wearing the head-mounted display device. When the preset image displayed in the see-through display seen by wearing the head-mounted display device coincides with the external real calibration graphic card, the positioning assembly of the head-mounted display device is controlled to collect the target calibration graphic card image. The control host can use the camera under the perspective of the wearer of the head-mounted display device (such as the industrial camera in FIG. 3) to calibrate the head-mounted display device. When the preset image displayed in the see-through display seen by wearing the head-mounted display device coincides with the external real calibration graphic card, the positioning assembly of the head-mounted display device is controlled to collect the target calibration graphic card image.

Figure 3:
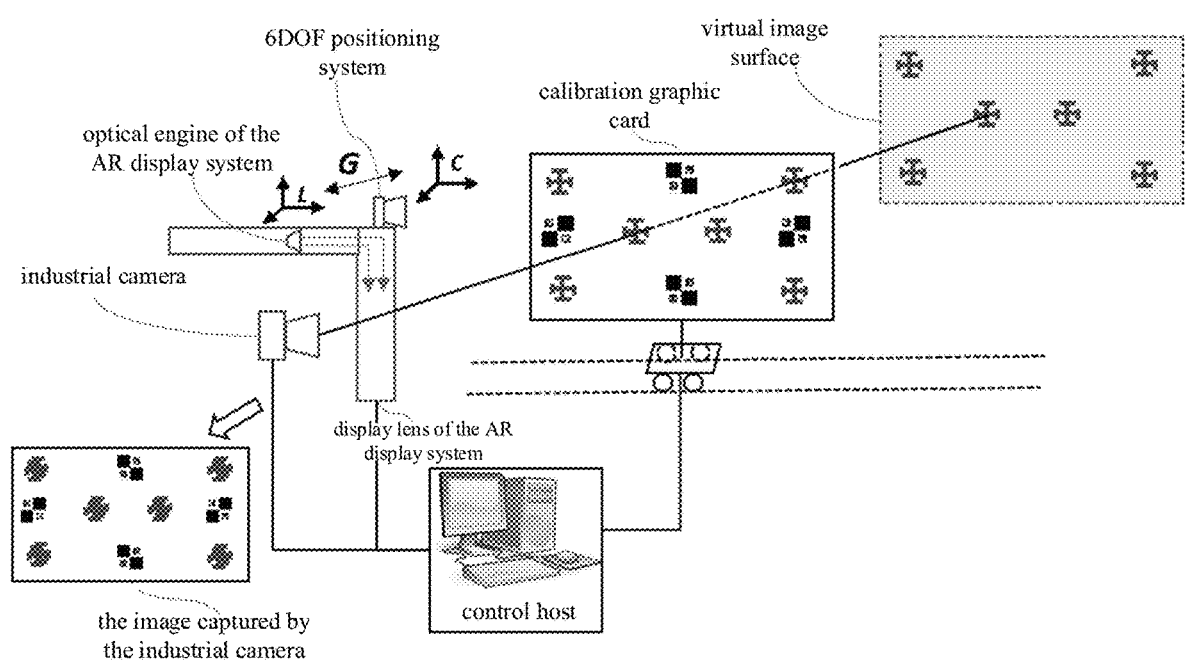
FIG. 3 is a schematic view of a calibration system for the head-mounted display device according to an embodiment of the present application.
Figure 4:
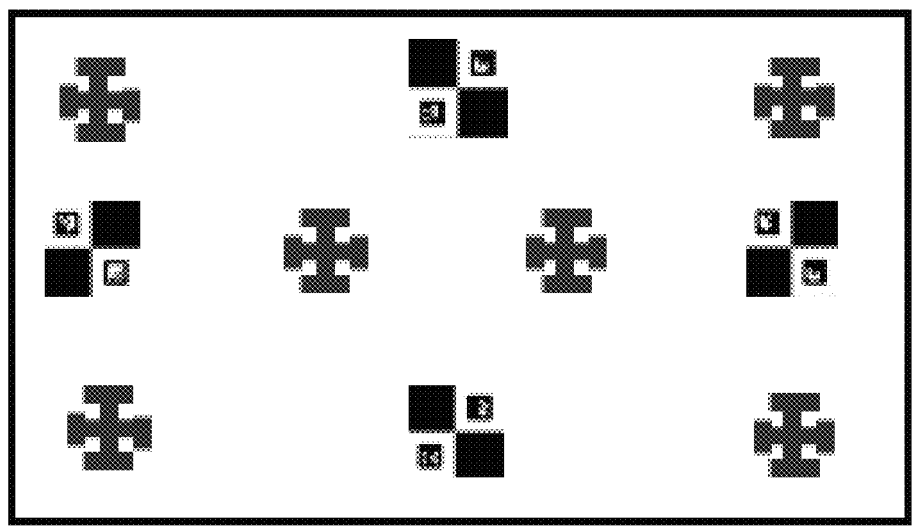
FIG. 4 is a display view of a calibration graphic card according to an embodiment of the present application.

Correspondingly, the 3D point coordinate corresponding to the target calibration graphic card image in this step can be the 3D point coordinate determined by the calibration graphic card in the target calibration graphic card image. That is to say, the calibration graphic card in this embodiment may include a calibration pattern configured to determine the 3D point coordinate, such as a quick response (QR) code checkerboard in FIG. 4. Correspondingly, the calibration graphic card may also include an alignment auxiliary mark pattern, such as the cross hairs in FIG. 4, to facilitate the alignment of the preset image and the real calibration graphic card. As shown in FIG. 3 and FIG. 4, after printed, the original image of the preset image of the calibration graphic card displayed on the see-through display can be placed on the movable device. During the calibration process, the calibration graphic card is moved through the movable device until the picture of the calibration graphic card is overlapped and aligned with the virtual image picture (i.e. the preset image) displayed on the see-through display. The calibration graphic card includes the QR code checkerboard and the cross hairs, the corner points of the checkerboard can be numbered by the QR code in the QR code checkerboard, and the cross hairs can be alignment auxiliary marks to facilitate the alignment detection of the display.

It should be noted that the method provided in this embodiment can be applied to the control host, that is, the processor in the control host can perform the steps of the method provided in this embodiment to calibrate the head-mounted display device. The method provided in this embodiment can also be applied to the head-mounted display device, that is, the processor of the head-mounted display device can perform the steps of the method provided in this embodiment to calibrate itself, which is not limited in this embodiment.

In an embodiment, the specific method for the processor to obtain the 3D point coordinate corresponding to the target calibration graphic card image in this step can be set by the designer according to practical scenarios and user needs. For example, when the preset image displayed in the see-through display from the perspective of the wearer of the head-mounted display device is determined to coincide with the real calibration graphic card by the processor of the control host, the positioning assembly of the head-mounted display device (such as the 6DOF positioning assembly) is controlled to collect the target calibration graphic card image and calculate the 3D point coordinate corresponding to the target calibration graphic card image, obtaining the 3D point coordinate sent by the head-mounted display device. The processor of the head-mounted display device determines the 3D point coordinate using the calibration pattern in the target calibration graphic card image according to the obtained calibration graphic card alignment instruction. For example, the processor of the head-mounted display device can control the positioning assembly to collect the target calibration graphic card image and calculate the 3D point coordinate corresponding to the target calibration graphic card image according to the calibration graphic card alignment instruction generated by the head-mounted display device when the preset image displayed in the see-through display of the wearer coincides with the real calibration graphic card.

Step S102, determining a corresponding relationship between the projection coordinate system of the optical engine and the coordinate system of the positioning assembly according to the 3D point coordinate.

It can be understood that, as shown in FIG. 2, a coordinate transformation, that is, a corresponding relationship T, from the world coordinate system W to the coordinate system C (that is, the projection coordinate system) of the 6DOF positioning system is obtained by the AR device through the 6DOF positioning assembly. The dotted line frame in the figure can be the virtual image surface displayed by the display lens, which is the two-dimensional uv coordinate system (that is, the projection coordinate system L of the optical engine). A corresponding relationship G between the coordinate system C of the 6DOF positioning system and the projection coordinate system L of the optical engine is to be solved, and a point P in the world coordinate system W has a corresponding point P' in the virtual image surface.

Correspondingly, the coordinate transformation process from point P to the point P' in FIG. 2 can be abstracted as a virtual camera model. The virtual image surface represented by the dotted line frame can be configured to simulate the image surface of the virtual camera, and the virtual camera model is illustrated as followed.

The coordinate transformation from point P (x, y, z) in the world coordinate system to point P' (u, v) in the image coordinate system can be decomposed into two steps: in the first step, point P is transformed into the coordinate system C of the 6DOF positioning system, which can be directly solved by the 6DOF positioning assembly, that is, $P_c=TP$, where $P_c$ represents the corresponding point of point P under the coordinate system of the positioning assembly, and $P_c=(x_c,y_c,z_c)$; in the second step, $P_c$ is transformed into the coordinate system of the optical engine, that is, $P_s=[R_{cv}|T_{cv}]$ $P_c=GP_c$, in the formula, $P_s$ represents the corresponding point of the $P_c$ point under the projection coordinate system of the optical engine, $R_{ev}$ is a 3*3 rotation matrix, representing a rotation of $P_c$ to the projection coordinate system of the optical engine, and Ter is a 3*1 translation vector, representing a translation of $P_c$ to the projection coordinate system of the optical engine. By introducing homogeneous coordinate transformation and expanding the above formula, the virtual camera projection model can be expressed by the following formula:

$$s\begin{bmatrix}u\\v\\1\end{bmatrix}=\begin{bmatrix}g_{11} & g_{12} & g_{13} & g_{14}\\g_{21} & g_{22} & g_{23} & g_{24}\\g_{31} & g_{32} & g_{33} & g_{34}\end{bmatrix}\begin{bmatrix}x_c\\y_c\\z_c\\1\end{bmatrix}$$

The overall projection transformation defined by the virtual camera can be represented by a 3*4 projection matrix (i.e. 3*4 projection matrix), that is, the corresponding relationship G between the coordinate system C of the 6DOF positioning system and the projection coordinate system L of the optical engine can be the 3*4 projection matrix. The entire $g_{ij}$ of the projection matrix can be directly estimated and calculated without using the real internal and external camera parameters, and the solution is simple and convenient.

Correspondingly, the estimation calculation of the 3*4 projection matrix is a standard technique commonly used in computer vision. By collecting the two-dimensional image coordinates of some known three-dimensional calibrate points to calibrate, a linear system solved by the projection matrix G is correspondingly defined between 3D coordinates and 2D coordinates.

In other words, in this step, the processor can determine the corresponding relationship between the projection coordinate system of the optical engine and the coordinate system of the positioning assembly (such as the 3*4 projection matrix G) through the 3D point coordinates and the 2D point coordinates corresponding to the 3D point coordinates under the projection coordinate system of the optical engine (that is, the 2D point coordinates corresponding to the preset image displayed on the see-through display). For example, in this step, the processor can calculate the corresponding relationship (such as the above 3*4 projection matrix G) between the projection coordinate system of the optical engine and the coordinate system of the positioning assembly through the singular value decomposition (SVD) according to the obtained 3D point coordinate.

Step S103, calibrating the display content of the head-mounted display device according to the corresponding relationship.

It can be understood that in this step, the processor can calibrate the display content of the head-mounted display device to calibrate the head-mounted display device based on the corresponding relationship between the projection coordinate system of the optical engine and the coordinate system of the positioning assembly.

Specifically, in this step, the specific way for the processor to calibrate the display content of the head-mounted display device according to the corresponding relationship can be set by the designer. For example, the control host can send the corresponding relationship to the head-mounted display device so that the head-mounted display device can compensate for the fixed deviation between the projection coordinate system of the optical engine and the coordinate system of the positioning assembly using the corresponding relationship, thus the virtual objects rendered and displayed by the head-mounted display device can be matched with the real-world objects.

In this embodiment, the corresponding relationship between the projection coordinate system of the optical engine and the coordinate system of the positioning assembly is determined according to the obtained 3D point coordinates corresponding to the target calibration graphic card image, which simplifies the process to calibrate the data collection. The calibration can be completed with only one alignment, which saves calibration time and is suitable for large-scale mass production.

Figure 5:
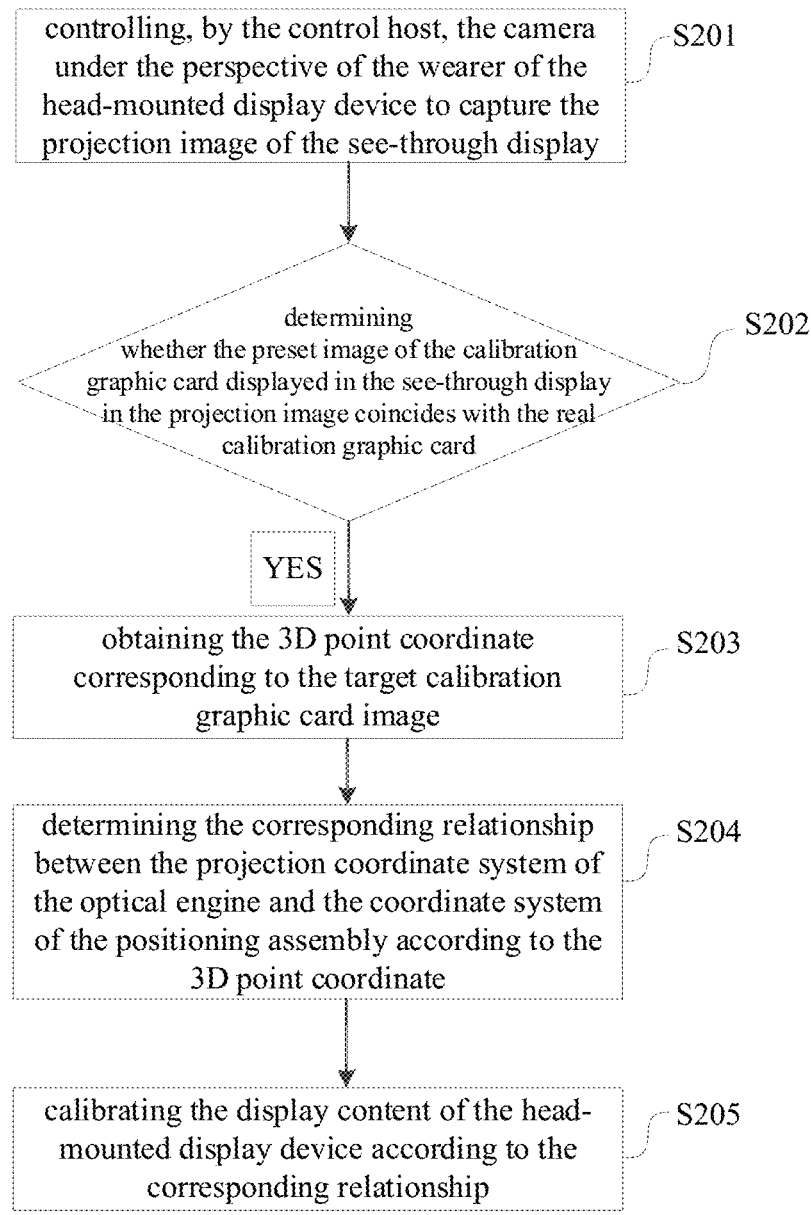
FIG. 5 is a flowchart of a calibration method for the head-mounted display device according to an embodiment of the present application.

Based on the above embodiment, the present application also provides a calibration method applied to the head-mounted display device of the control host to ensure the accuracy of the calibration of the head-mounted display device. Specifically, please refer to FIG. 5. FIG. 5 is a flowchart of a calibration method for the head-mounted display device according to an embodiment of the present application. The method can include:

Step S201, controlling, by the control host, the camera under the perspective of the wearer of the head-mounted display device to capture the projection image of the see-through display.

The camera (such as the industrial camera in FIG. 3) under the perspective of the wearer in this step can be located behind the see-through display of the head-mounted display device, acting as the human eye during use to capture the virtual image projected by the optical engine and the ambient light of the see-through display. The projection image captured by the camera can include the preset image of the calibration graphic card displayed on the see-through display and the image of the real calibration graphic card outside the see-through display.

In an embodiment, the see-through display can be a display configured to display the image projected by the optical engine of the head-mounted display device, such as a transparent lens. The user can see the external ambient light through the see-through display to achieve a see-through effect. The transmission display method of the see-through display is not limited in this embodiment, for example, the optical wave-guide display or the curved prism display can be adopted.

Step S202, determining whether the preset image of the calibration graphic card displayed in the see-through display in the projection image coincides with the real calibration graphic card; in response to that the preset image of the calibration graphic card displayed in the see-through display in the projection image coincides with the real calibration graphic card, proceed to step S203.

It can be understood that in this step, the control host can determine whether to control the positioning assembly of the head-mounted display device to collect the target calibration graphic card image according to whether the preset image of the calibration graphic card displayed in the see-through display in the projection image coincides with the image of the real calibration graphic card in the projection image. When the preset image coincides with the image of the real calibration graphic card, the positioning assembly is controlled to collect the target calibration graphic card image to calibrate the head-mounted display device.

Specifically, in this step, the specific way for the processor of the control host to determine whether the preset image of the calibration graphic card displayed in the see-through display in the projection image coincides with the real calibration graphic card can be set by the designer. For example, the control host can determine whether the preset image of the calibration graphic card displayed in the see-through display in the projection image coincides with the real calibration graphic card according to the obtained projection image sent by the camera.

Correspondingly, in this step, in response to that the preset image does not coincide with the real calibration graphic card, the designer can set it according to the practical scenario and user's needs. For example, when the preset image does not coincide with the real calibration graphic card, the control host can output a calibration graphic card position adjustment information to prompt the calibration personnel to adjust the position of the calibration graphic card. The control host can also control the movable device of the calibration graphic card to move the position of the calibration graphic card. For example, the control host can control the movable device of the calibration graphic card to move the calibration graphic card according to the obtained projection image. As shown in FIG. 3, the control host can correspondingly move the trolley (i.e. the movable device) placed with the calibration graphic card according to the image captured by the industrial camera when the preset image in the image (that is, the projection image) taken by the industrial camera does not coincide with the real calibration graphic card.

Step S203, obtaining the 3D point coordinate corresponding to the target calibration graphic card image.

Step S204, determining the corresponding relationship between the projection coordinate system of the optical engine and the coordinate system of the positioning assembly according to the 3D point coordinate.

Step S205, calibrating the display content of the head-mounted display device according to the corresponding relationship.

Specifically, steps S203 to S205 correspond to steps S101 to S103 in the above embodiment, and will not be described again.

In this embodiment, the present application uses the camera under the perspective of the wearer of the head-mounted display device instead of human eye to recognize, and recognizes the coincidence alignment results through the control host, which has a high reliability, a precise control, and improves the calibration efficiency.

Corresponding to the above method embodiment, the present application also provides a calibration apparatus for the head-mounted display device, which can refer correspondingly to the calibration method for the head-mounted display device.

Figure 6:
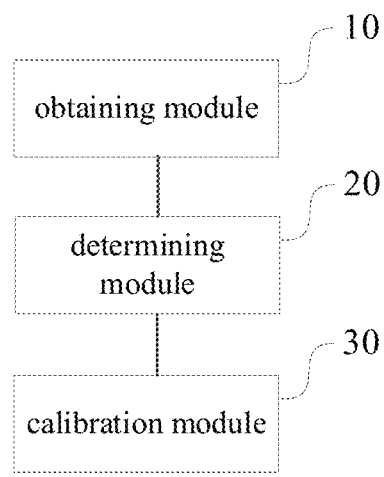
FIG. 6 is a structural block view of a calibration apparatus for the head-mounted display device according to an embodiment of the present application.

Please refer to FIG. 6, FIG. 6 is a structural block view of a calibration apparatus for the head-mounted display device according to an embodiment of the present application. The apparatus may include: an obtaining module 10, a determining module 20 and a calibration module 30.

The obtaining module 10 is configured to obtain the 3D point coordinate corresponding to the target calibration graphic card image. The target calibration graphic card image includes the image of the calibration graphic card, and the target calibration graphic card image is the image captured by the positioning assembly when the preset image of the calibration graphic card projected by the optical engine on the see-through display coincides with the real calibration graphic card from the perspective of the wearer of the head-mounted display device.

The determining module 20 is configured to determine the corresponding relationship between the projection coordinate system of the optical engine and the coordinate system of the positioning assembly according to the 3D point coordinate.

The calibration module 30 is configured to calibrate the display content of the head-mounted display device according to the corresponding relationship.

In an embodiment, when applied to the control host, the apparatus also includes: a controlling module and a judging module.

The controlling module is configured to control the camera under the perspective of the wearer to capture the projection image of the see-through display.

The judging module is configured to determine whether the preset image displayed by the see-through display in the projection image coincides with the real calibration graphic card; in response to that the preset image displayed by the see-through display in the projection image coincides with the real calibration graphic card, a start signal is sent to the obtaining module 10.

In an embodiment, the judging module can include a moving sub-module configured to control the movable device of the calibration graphic card to move the calibration graphic card according to the projection image in response to that the preset image displayed by the see-through display in the projection image does not coincide with the real calibration graphic card.

In an embodiment, when the device is applied to a head-mounted display device, the obtaining module 10 can be specifically configured to determine the 3D point coordinate using the calibration pattern in the target calibration graphic card image according to the calibration graphic card alignment instruction.

In an embodiment, when the corresponding relationship is a 3*4 projection matrix, the determining module 20 can be specifically configured to calculate the 3*4 projection matrix through the singular value decomposition according to the 3D point coordinate.

In this embodiment, the present application uses the determining module 20 to determine the corresponding relationship between the projection coordinate system of the optical engine and the coordinate system of the positioning assembly according to the 3D point coordinate corresponding to the obtained target calibration graphic card image, which simplifies the process to calibrate the data collection. The calibration can be completed with only one alignment, which saves calibration time and is suitable for large-scale mass production.

Corresponding to the above method embodiment, the present application also provides a calibration device for the head-mounted display device, which can refer correspondingly to the calibration method for the head-mounted display device.

The present application provides a calibration device for the head-mounted display device, including: a memory and a processor.

The memory is configured to store computer programs.

The processor is configured to implement the steps of the calibration method for the head-mounted display device provided in the above embodiment when executing the computer program.

In an embodiment, the calibration device provided in this embodiment may be the head-mounted display device or the control host.

Corresponding to the above method embodiment, the present application also provides a calibration system for the head-mounted display device, which can refer correspondingly to the calibration method for the head-mounted display device.

the present application provides a calibration system for the head-mounted display device, including: the head-mounted display device and the control host. The control host is the calibration device for the head-mounted display device as provided in the above embodiment.

In an embodiment, the system can also include a camera configured to capture the projection image of the see-through display of the head-mounted display device under the perspective of the wearer of the head-mounted display device.

In an embodiment, the system can also include a movable device configured to move the calibration graphic card according to the control of the control host.

Corresponding to the above method embodiment, the present application also provides a computer-readable storage medium, which can refer correspondingly to the calibration method for the head-mounted display device.

The present application provides a computer-readable storage medium. The computer-readable storage medium stores a computer program. When the computer program is executed by the processor, the steps of the calibration method for the head-mounted display device provided by the above method embodiment are implemented.

Each embodiment in the specification is described in a progressive manner. Each embodiment focuses on its differences from other embodiments. The same and similar parts between various embodiments can be referred to each other. As for the apparatus, devices, systems and computer-readable storage media disclosed in the embodiments, since they correspond to the methods disclosed in the embodiments, the description is relatively simple. For relevant details, please refer to the description of the method section.

The above is a detailed introduction to the calibration method, the apparatus, the device, the system and the computer-readable storage medium for the head-mounted display device provided by the present application, the principles and implementation methods of which are illustrated through specific examples. The description of the above embodiments is only intended to help understand the method and core ideas of the present application. It should be noted that for those skilled in the art, several improvements and modifications can be made to the present application without departing from the principles of the present application, and these improvements and modifications also fall in the protection scope of the present application.

What is claimed is:

1. A calibration method for a head-mounted display device, comprising:
    obtaining a three dimensional (3D) point coordinate corresponding to a target calibration graphic card image; wherein the target calibration graphic card image comprises an image of a calibration graphic card, and the target calibration graphic card image is an image captured by a positioning assembly in response to that a preset image of the calibration graphic card projected by an optical engine on a see-through display coincides with a real calibration graphic card under a perspective of a wearer of the head-mounted display device;
    determining a corresponding relationship between a projection coordinate system of the optical engine and a coordinate system of the positioning assembly according to the 3D point coordinate; and
    calibrating display content of the head-mounted display device according to the corresponding relationship,
    wherein in response to that the corresponding relationship is a 3*4 projection matrix, the determining the corresponding relationship between the projection coordinate system of the optical engine and the coordinate system of the positioning assembly according to the 3D point coordinate comprises:
        calculating the 3*4 projection matrix through singular value decomposition according to the 3D point coordinate.

2. The calibration method for the head-mounted display device of claim 1, wherein before obtaining the 3D point coordinate corresponding to the target calibration graphic card image, the method further comprises:
    controlling, by a control host, a camera under the perspective of the wearer to capture a projection image of the see-through display;
    determining whether the preset image displayed in the see-through display in the projection image coincides with the real calibration graphic card; and
    in response to that the preset image displayed in the see-through display in the projection image coincides with the real calibration graphic card, obtaining the 3D point coordinate corresponding to the target calibration graphic card image.

3. The calibration method for the head-mounted display device of claim 2, wherein after the controlling, by the control host, the camera under the perspective of the wearer to capture the projection image of the see-through display, the method further comprises:
    in response to that the preset image displayed in the see-through display in the projection image does not coincide with the real calibration graphic card, controlling a movable device of the calibration graphic card to move the calibration graphic card according to the projection image.

4. The calibration method for the head-mounted display device of claim 1, wherein the obtaining the 3D point coordinate corresponding to the target calibration graphic card image comprises:
    determining, by the head-mounted display device, the 3D point coordinate by using a calibration pattern in the target calibration graphic card image according to an obtained calibration graphic card alignment instruction.

5. A calibration apparatus for a head-mounted display device, comprising:
    an obtaining module configured to obtain a 3D point coordinate corresponding to a target calibration graphic card image; wherein the target calibration graphic card image comprises an image of the calibration graphic card, and the target calibration graphic card image is an image captured by the positioning assembly in response to that a preset image of the calibration graphic card projected by an optical engine on a see-through display coincides with a real calibration graphic card from a perspective of the wearer of the head-mounted display device;
    a determining module configured to determine a corresponding relationship between a projection coordinate system of the optical engine and a coordinate system of the positioning assembly according to the 3D point coordinate; and
    a calibration module configured to calibrate a display content of the head-mounted display device according to the corresponding relationship,
    wherein in response to that the corresponding relationship is a 3*4 projection matrix, the determining module is configured to calculate the 3*4 projection matrix through singular value decomposition according to the 3D point coordinate.

6. A calibration device for a head-mounted display device, comprising:
    a memory configured to store a computer program; and
    a processor configured to implement the calibration method for the head-mounted display device of claim 1 when the computer program is executed.

7. A calibration system for a head-mounted display device, comprising a head-mounted display device and a control host;
    wherein the control host is the calibration device for the head-mounted display device of claim 6.

8. The calibration system for the head-mounted display device of claim 7, further comprising:
    a camera configured to capture a projection image of a see-through display of the head-mounted display device under a perspective of a wearer of the head-mounted display device; and
    a movable device configured to move a calibration graphic card according to a control of the control host.

9. A non-transitory computer-readable storage medium, wherein a computer program is stored on the non-transitory computer-readable storage medium, and the calibration method for the head-mounted display device of claim 1 is implemented in response to that the computer program is executed by a processor.

\* \* \* \* \*